US006898089B2

(12) United States Patent
Oates

(10) Patent No.: US 6,898,089 B2
(45) Date of Patent: May 24, 2005

(54) SOLID STATE CONVERTER FOR HIGH VOLTAGES

(75) Inventor: Donald Colin Murray Oates, Brocton (GB)

(73) Assignee: Alstom, Paris (FR)

( * ) Notice: Subject to any disclaimer, the term of this patent is extended or adjusted under 35 U.S.C. 154(b) by 0 days.

(21) Appl. No.: 10/239,014

(22) PCT Filed: Mar. 16, 2001

(86) PCT No.: PCT/GB01/01157

§ 371 (c)(1),
(2), (4) Date: Dec. 16, 2002

(87) PCT Pub. No.: WO01/71898

PCT Pub. Date: Sep. 27, 2001

(65) Prior Publication Data

US 2003/0095424 A1 May 22, 2003

(30) Foreign Application Priority Data

Mar. 18, 2000 (GB) .............................................. 0006513

(51) Int. Cl.[7] .......................................... H02M 3/335
(52) U.S. Cl. ........................... 363/17; 363/98; 363/132
(58) Field of Search ........................... 363/17, 98, 127, 363/132

(56) References Cited

U.S. PATENT DOCUMENTS

| 3,959,719 | A |   | 5/1976 | Espelage |
| 4,672,528 | A | * | 6/1987 | Park et al. ..................... 363/98 |
| 4,688,165 | A |   | 8/1987 | Pruitt |
| 4,864,479 | A | * | 9/1989 | Steigerwald et al. .......... 363/17 |
| 5,208,738 | A | * | 5/1993 | Jain ............................. 363/17 |
| 5,321,599 | A | * | 6/1994 | Tanamachi et al. ........... 363/41 |
| 5,504,668 | A | * | 4/1996 | Beyerlein et al. ............. 363/95 |
| 5,617,308 | A | * | 4/1997 | Weise et al. .................. 363/98 |
| 5,621,634 | A | * | 4/1997 | Sato ............................. 363/98 |
| 5,625,539 | A | * | 4/1997 | Nakata et al. ................ 363/17 |
| 5,798,916 | A |   | 8/1998 | Stacey et al. |
| 5,889,667 | A | * | 3/1999 | Bernet ......................... 363/127 |
| 5,949,672 | A |   | 9/1999 | Bernet |
| 6,072,856 | A | * | 6/2000 | Van Der Broeck et al. . 378/101 |

FOREIGN PATENT DOCUMENTS

| EP | 0 379 580 A1 | 8/1990 |
| GB | 1042369 | 9/1966 |
| GB | 1153440 | 5/1969 |
| GB | 2301239 A | 11/1996 |
| JP | 55008278 A | 1/1980 |
| JP | 10042576 A | 2/1998 |
| JP | 11055954 A | 2/1999 |

OTHER PUBLICATIONS

Mikihiko Matsui, et al., *Macroscopic Modeling of a Parallel Resonant Link Converter and its Application to Closed–loop Link Voltage Control*, IAS 1997, Conference Record of the 1997 IEEE Industry Applications Conference 32nd. IAS Annual Meeting, New Orleans, LA, Oct. 5–9, 1997, pp. 1421–1428.

Matsui, M., et al., *High–Frequency Link DC/AC Converter with Suppressed Voltage Clamp Circuits—Naturally Commutated Phase Angle Control with Self Turn–Off Devices*, IEEE Transactions on Industry Applications, US., IEEE Inc., New York, vol. 32, No. 2, Mar. 1, 1996, pp. 293–300.

* cited by examiner

*Primary Examiner*—Gary L. Laxton
(74) *Attorney, Agent, or Firm*—Kirschstein, et al.

(57) ABSTRACT

A converter for high voltages includes a bridge circuit having serially arranged switching assemblies so connected as to define at least two input notes and two output nodes. The input nodes are adapted to receive an input voltage across the input nodes, and the output nodes are adapted to provide a take-off point for the output waveform. A control circuit supplies a respective control signal to each switching assembly in the bridge circuit. A resonant circuit is connected across the output nodes. The devices are switched at the resonant frequency of the resonant circuit. Thus, by switching as the current crosses zero in the resonant circuit, sudden rises in voltage across the devices are avoided.

14 Claims, 2 Drawing Sheets

US 6,898,089 B2

SOLID STATE CONVERTER FOR HIGH VOLTAGES

BACKGROUND OF THE INVENTION

The invention relates to improvements in converters, and in particular to an improved apparatus for converting an input voltage, such as a direct current voltage (d.c.) or an alternating current (a.c) voltage, into an a.c. output voltage. It relates especially to converters for very high voltages employing semiconductor switching devices.

For high voltage transmission and distribution networks there is a need to convert voltages from one type or level to another. This may be to step down from a first voltage, for example 200 kVolt distribution voltage, to a lower level such as 66 kVolts for an urban network, or to convert a high voltage dc waveform to an alternating waveform to drive a load such as a motor. Such voltages are commonly found in both industrial and domestic power distribution systems as well as electrified railway systems.

Traditionally the conversion of such high voltages has been performed using a transformer protected by circuit breakers. The transformer comprises a primary having a winding of a first number of turn and a secondary having a winding with a second, different, number of turns. The output voltage will differ from the input voltage by the ratio of the turns on the windings. Transformers are bulky and inflexible in terms of their operation. It has therefore been proposed to employ semiconductor switching devices to construct a converter for very high voltages.

The use of semiconductor devices in converters for converting a supply voltage to an output voltage is well known in the art for relatively low voltages up to several hundreds of volts. By converter we mean an apparatus which is adapted to convert a first input voltage into an output at a second voltage. If the output voltage is at the same frequency as the input voltage then the converter can be used to replace a step up or step down transformer. Alternatively, the converter could be used to convert an alternating waveform (ac) to a steady state voltage at the output (dc) or vice versa.

Although the development of high power semiconductor switching devices is advancing rapidly, at present the maximum input voltage that can be handled by a solid state converter is quite limited due to the relatively low maximum switching voltage that can be safely handled by the individual switching devices used.

The applicant is aware of semiconductor switching devices that can handle peak voltages of 6.5 kVolts. To ensure that the instantaneous peak voltages that arise immediately after the devices are switched can be handled, then these devices limit the peak input voltage to around half of their peak rating, i.e. 3.6 kVolts. Whilst this is more than adequate for the production of converters for domestic voltage levels, this is far below the voltage handling capacity required for converting the high voltages used in transmission and distribution systems which can be up to 400 kVolts or more.

In order to increase the voltage capacity which can be safely handled, it has been proposed to provide a number of identical converters connected in series. Thus, two identical switching circuits could be provided in series to double the voltage handling capacity with the voltage being dropped equally across the two circuits. In practice this proves impractical for the production of converters for the high voltages used in distribution networks due to the extremely high parts count that would result and the need to synchronise the switching of the devices to a very high level of precision. If the circuits are not identical then the voltage may not be shared equally which could overload an individual circuit. This could lead to a catastrophic failure.

SUMMARY OF THE INVENTION

An object of the present invention is to ameliorate some of the limitations of prior art power electronic circuits for producing an output waveform from a chosen input voltage waveform.

In accordance with a first aspect, the invention provides apparatus for producing an alternating voltage output waveform from an input voltage, the apparatus comprising:
  a bridge circuit having one or more switching assemblies so connected as to define at least two input nodes and two output nodes, the input nodes being adapted to receive the input voltage across the nodes, and the output nodes being adapted to provide a take-off point for the output waveform;
  a control circuit adapted to supply a respective control signal to each switching assembly in the bridge circuit;
  and a resonant circuit connected across the output nodes;
  each switching assembly comprising at least two semiconductor switching devices connected in series between an input node and an output node to define an arm of the bridge circuit;
  and further in which the control circuit is adapted to generate control signals which turn the switching devices of the switching assemblies in each arm on and off in a pattern having a period substantially equal to the resonant frequency of the resonant circuit to provide an output waveform across the output terminals which is substantially at the resonant frequency.

Preferably, the control circuit is adapted to switch each device in an arm of the bridge from an on state to an off state for substantially one half cycle of the current in the resonant circuit and from the off state to the on state for the remaining half cycle with the switching being performed substantially at the resonant frequency of the resonant circuit.

The invention thus provides apparatus in which the output frequency of an output waveform is set by a resonant circuit. The resonant circuit controls the energy flow in the bridge. Thus, by switching the switching assemblies at the resonant frequency it is possible to prevent sudden rises in voltage across the switching assemblies in each arm, enabling series connected devices to be used and so allowing higher voltages to be converted.

The control signals for each of the devices may all be different and may be generated independently. However, it is preferred that some of the devices share the same control signals.

The applicant has appreciated that placing more devices in series allows higher voltages to be switched as the voltage dropped between the input node and the output node at any instant is shared across the devices. It is envisaged that at least 10 devices, or perhaps 20 devices or 50 or more devices may be connected together in each arm of the bridge depending on the voltage to be handled.

It is envisaged that sufficient devices may be provided in series in each arm to enable voltages of at least 200 kVolts or perhaps at least 400 kVolts to be switched.

In one notable arrangement, the control circuit may be adapted to produce control signals that switch every device in an arm of the bridge from the on state to the off state and vice versa at substantially the same time, the switching being performed substantially at the resonant frequency of the resonant circuit. In use, the devices in one or more arms of the bridge may all be switched on whilst the devices in the remaining arms of the bridge are switched off for one half of a cycle of the current in the resonant circuit. The devices may then all be switched over under the control of the control signals for the remaining half cycle. This pattern may then be repeated. This control pattern is especially suitable for use with a steady state dc input voltage as it enables the resonant circuit to be charged and maintains charge flowing around the resonant circuit.

Preferably a capacitor is connected in parallel with each of the switching devices in the arms of the bridge. These capacitors can be chosen to have a considerably higher value than the stray capacitance associated with each switching device. Thus, the rate of change of voltage across each switching device will then be almost completely determined by the capacitance value of the capacitors.

Of course, if desired a capacitor may be provided across a number of switching devices. This would then limit the voltage change across those devices associated with that capacitor but not the individual device.

For example, for a circuit in which n switching devices are connected in series in each arm, with n an integer greater than one, if every device is provided with a capacitor of identical value then the voltage will be shared equally across each device.

In practice, due to slight differences in switching times and stray inductance, resistance and capacitance associated with each device then a residual charge may build up on one or more of the capacitors. Eventually, if left unchecked, this could result in unequal voltage sharing across the switching devices.

The control circuit may be adapted to switch all of the switching devices in the bridge so that they are in the on state (i.e. conducting) at the same instant substantially as the voltage across the output nodes crosses zero. This shorts out the arms of the bridge and effectively resets the voltage across the capacitors in the arms and so prevents the build up of charge on the capacitors over time.

The devices may all be held in the on state for a predetermined period of time to ensure that they are all on at the same time regardless of any possible delays in switching due to different turn on/turn off times of the devices.

The presence of the resonant circuit thus overcomes the limitations which would otherwise be present in a bridge converter circuit that uses series connected devices.

The devices may all be simultaneously turned on periodically, at either the resonant frequency of the bridge or periodically at some lower rate, or perhaps intermittently.

Because the switching times of semiconductor devices are very short, a change from the on state to the off state typically taking 200 nanoseconds, small differences in the times at which control signals are applied to each device, either to switch from the on state to the off state or vice versa, may result in the entire voltage across an arm appearing across one switching device. Even with high speed optical communication systems, delays of around 40–60 nanoseconds can occur resulting in inadequate coordination. By switching at the resonant frequency then it is possible to switch at the zero crossing point so that timing is less critical.

The resonant circuit may comprise an inductive element which is connected in series with a capacitive element between the output nodes. Of course, many other resonant circuits are possible which may include a combination of inductive, resistive and/or capacative elements.

The switching devices of the switching assemblies may comprise semiconductor switching devices. For high speed-switching these will preferably comprise power semiconductor devices such as metal-oxide semiconductor field effect transistors (MOSFET), IGBT, or gate turn off transistors (GTO).

In a most notable arrangement, each of the switching devices of the switching assemblies may be arranged to switch from an open to a closed state substantially as the voltage across the resonant circuit, and hence output nodes, crosses zero. This again helps to ensure that small errors in stray capacitance and switching delays do not cause extra voltages to appear across the switching assemblies.

The control circuit may be adapted to generate a single command signal which is modified to produce appropriate control signals which respectively determine the switching state of every device in arm of the bridge.

The control circuit may include a central processing unit which generates the control signals from a look-up table or a set of rules or instructions contained in memory.

An inductor may be connected in series between at least one of the input nodes and the input voltage that is connected to that node. This ensures the bridge circuit is current fed.

The apparatus may further include an isolating transformer having a primary winding and at least one secondary winding, the primary winding being connected across the output nodes and the secondary winding providing a take-off point from which the output waveform may be taken.

The provision of the isolating transformer ensures that changes in the inductance or capacitance of the load do not alter the resonant frequency of the apparatus. It also provides isolation of the output from the input.

The switching assemblies in the bridge may be adapted to provide unidirectional switching. Alternatively they may be adapted to provide bi-directional switching.

For unidirectional switching, each of the switching devices of the switching assemblies may comprise a single switching device which is operable between a first state in which current can flow through the device and a second state in which current is prevented from flowing through the device. A diode may be connected in parallel with the device, and a capacitor as described hereinbefore. In use, the control means switches all the devices in a respective arm of the bridge to the first state to allow current to flow along the arm or to the second state to prevent current flow along the arm. Importantly, any diodes in the arm must be connected in the same direction.

For bidirectional switching, each switching assembly may comprise two of the switching devices/diodes/snubber capacitors for unidirectional switching that are connected back to back. The control means switches one device to its first state and the other device to its second state and vice versa. Thus, current can flow in one direction through one device and the diode of the other device. By reversing the state of the devices of the pair allows current flow in the opposing direction. This switching occurs at the resonant frequency of the circuit.

The circuit may be adapted to operate with either a steady state(i.e. dc) or an alternating (ac) input voltage.

Thus in accordance with a second aspect the invention provides a converter for converting a multiple phase alternating input voltage waveform into a single phase alternating output voltage waveform, the converter including a matrix having one or more switching assemblies so connected as to define at least two pairs of input nodes and two output nodes, each of the two pair of input nodes being adapted to receive on input voltage from one phase of the supply across the nodes, and the output nodes being adapted to provide a take-off point for the single phase alternating output waveform;

a control circuit adapted to supply a control waveform to each switching assembly in the bridge circuit;

and a resonant circuit connected across the output nodes;

each switching assembly comprising at least two semiconductor switching devices connected in series between an input node and an output node to define an arm of the matrix circuit;

and further in which the control circuit is adapted to generate control signals which turn the switching devices of the switching assemblies in each arm on and off in a pattern having a period substantially equal to the resonant frequency of the resonant circuit to provide an output waveform across the output nodes which is substantially at the resonant frequency, and in which the resonant circuit has a resonant frequency that is greater than the frequency of the input waveforms.

In its simplest form the converter may comprise two pairs of arms. The four arms may be connected together in the bridge to define two input nodes. The input voltage may be connected across these two input nodes, and one may be held at ground if required.

In accordance with a third aspect, the invention may comprise a converter for converting a multiple phase alternating input voltage waveform into a single phase alternating output voltage waveform, the converter including apparatus according to the first aspect of the invention having an input node for each input phase and two output nodes, the switching assemblies defining multiple pairs of arms with one pair of arms for each input phase, and in which the resonant circuit has a resonant frequency that is greater than the frequency of the input waveforms.

Thus for an alternating input voltage, which will typically be sinusoidal, two or more pairs of arms may be provided which are so connected and arranged that an input node is defined for each phase of the input waveform. For example, for a three phase input voltage six arms may be provided. For a four phase input voltage then eight arms may be provided which are so connected and arranged as to define four input nodes.

The resonant frequency of the resonant circuit may be selected to be considerably higher than the frequency of the input waveform. It may be at least ten times higher, or 100 times higher, or perhaps at least 1000 or more times higher than the frequency of the input waveform.

For example, for a 50 Hz input waveform, a 5 kHz resonant frequency may be used.

The converter may include means for constructing one or more output waveforms from the sinusoidal waveform produced across the output nodes. This means may include a number of additional switching devices that are driven using a pulse width modulated control to construct the desired output waveform.

BRIEF DESCRIPTION OF THE DRAWINGS

There will now be described by way of example only, one embodiment of the present invention with reference to the accompanying figures of the drawings of which.

DETAILED DESCRIPTION OF THE PREFERRED EMBODIMENTS

Figure 1:
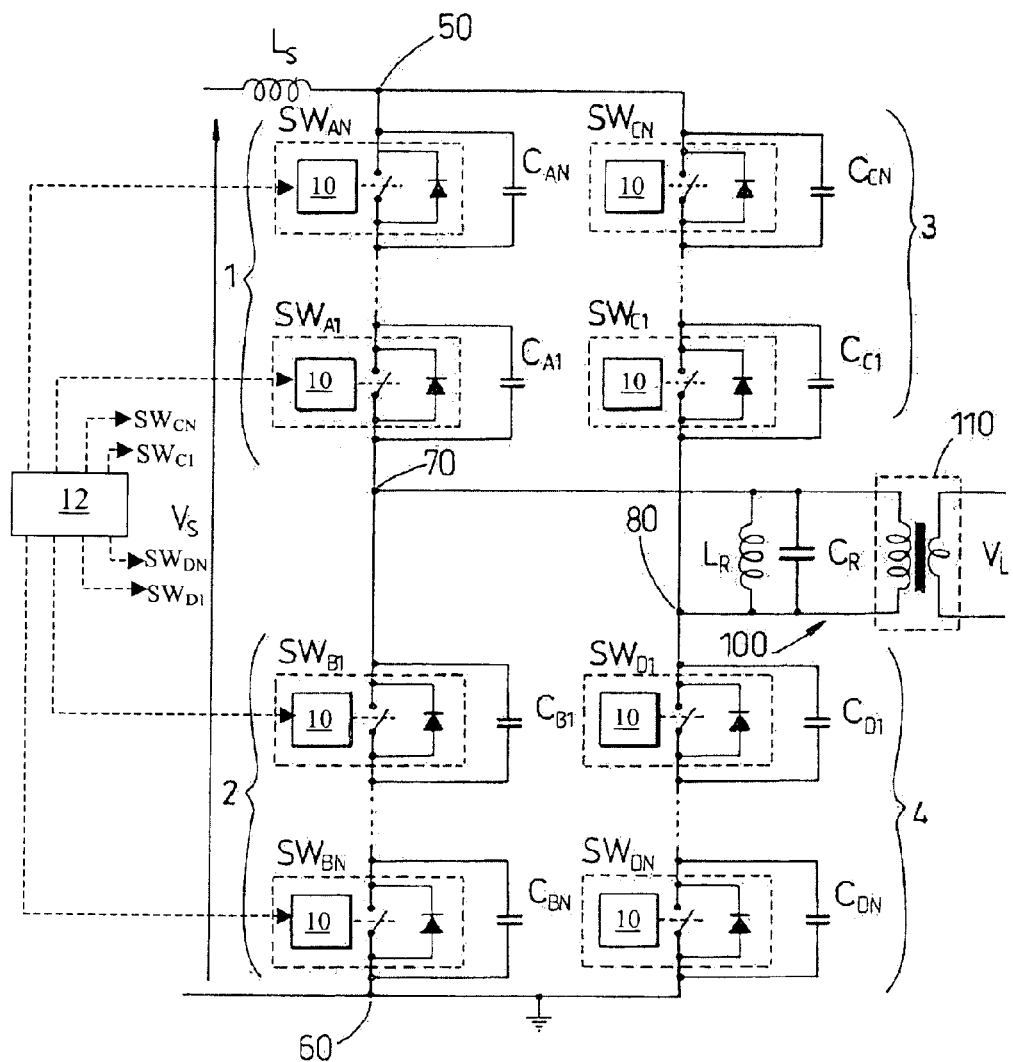
FIG. 1 illustrates a high voltage conversion circuit adapted to convert an d.c. input voltage into an a.c. output voltage in accordance with the invention.

The circuit in FIG. 1 is adapted to convert a d.c. input voltage $V_S$ to a single phase alternating output voltage $V_L$. It comprises a bridge circuit having four identical arms comprising switching assemblies 1,2,3,4, which are connected together to define a four arm bridge. Each switching assembly comprises up to 80 serially connected switching devices $SW_{A(1\ to\ N)}$, $SW_{B(1\ to\ N)}$, $SW_{C(1\ to\ N)}$, $SW_{D(1\ to\ N)}$, depending on the maximum input voltage which is to be handled by the apparatus. Only two devices in each arm are shown for clarity.

The arms are also connected as two series connected pairs, with each end of the two pairs connecting to a respective end of the other pair of arms so that the switching assemblies form a loop. The points at which the ends of the two pairs of arms are connected define two input nodes 50,60 whereby input voltages can be applied to the bridge. Two centre taps 70,80 between the arms of each pair define two output nodes 70,80 across which an output voltage can be taken from the bridge in the manner set out hereinbelow.

As shown in FIG. 1 of the accompanying drawings, each switching device $SW_{A1}$, etc., in the bridge (of which two are shown) consists of a high voltage semiconductor switching device (MOSFET, IGBT, GTO for example), a diode connected in parallel across the switching device, an isolated control 10 whereby the state of the switching device may be switched by a control signal applied to the isolated control, and a capacitor connected in parallel with the switching device.

The control signals applied to each of the isolated controls are provided by a control circuit means 12 which co-ordinates the timing of the switching of the devices in a predetermined pattern.

A direct current input voltage waveform $V_S$, for instance from a high voltage transmission network, is connected across the input nodes to the bridge. An inductor Ls isolates one of the nodes from the input waveform whilst the other is earthed to a suitable earth point common to the input signal. Provision of the inductor Ls ensures the bridge is current fed and regulates the supply of current to the bridge.

A resonant circuit 100 is connected across the two output nodes 70,80. This resonant circuit 100 comprises a parallel connected LC circuit. The values of the inductive and capacitive component of the resonant circuit are chosen so that the resonant frequency of the combined LC circuit and bridge matches that of the desired output frequency to be obtained from the apparatus. In the example shown the input voltage is around 140 kVolts and the resonant frequency of the resonant circuit is conveniently set to 5 kHz from which a 5 kHz output waveform can be generated.

The primary (input) side of an isolating transformer 110 is connected in parallel with the resonant circuit 100 across the output nodes 70,80, and the secondary (output) side of the transformer 110 is connected to an electrical load. The load draws power at the 5 kHz frequency of the resonant circuit.

The control circuit 12 comprises, for example, a microprocessor which generates individual control signals shown as dashed arrow lines that are supplied to respective isolated controls 10 for the switching devices. Each control signal comprises a periodically repeating pattern of instructions for the isolating controls to change the state of the switching devices, for instance from on to off or vice versa. To avoid cluttering the diagram of FIG. 1, only the signal pathways to the switching devices on the left side of the diagram are shown in full.

In operation, the switching devices are alternately opened and closed by switching on the switching devices in diagonally opposed arms 1,3 and 2,4 of the bridge whilst switching off the remaining devices. This switching occurs at the resonant frequency of the apparatus. Current is therefore fed into the resonant circuit first in one direction and then in the other, in sympathy with the rise and fall of voltage in the resonant circuit, i.e. at the resonant frequency. This produces a sinusoidal output voltage across the output nodes at the resonant frequency of the circuit.

The control signals are selected so that the switching devices change state (from open to closed or vice versa) as the sinusoidal output voltage crosses zero. In this manner, switching losses are minimised as there is no rapid transition of voltage across the switching devices. Also, slight errors in the timing of the switching are less critical.

Because the bridge circuit shown in FIG. 1 is current fed, the control of the switches must enable the input inductor Ls to see a current path either through the resonant circuit across the bridge or to the earthed node. This is achieved in the example by ensuring that the control signals instruct the switching devices to all turn on momentarily before the appropriate sides of the bridge are turned off. At this moment in time, the current in the resonant circuit will be at a maximum, so the turn on time is kept as short as possible.

By switching all the devices on for a short period the charge on the capacitors in the arms of the bridge is dissipated. This is important for ensuring that the capacitors function correctly to ensure correct voltage sharing. Without these discharge periods a residual voltage may build up due to charge on individual capacitors. Of course, it is not essential that they are ail switched to the on state at the same time, simply that they are all held in the on state for an overlapping period of time.

Selection of the rating of the snubber capacitor across each switching device in this embodiment depends on the input voltage and the chosen output frequency, but must be large enough to swamp all stray capacitance effects around the switching device. However, the applicant appreciates that such capacitance will affect the resonant frequency of the control bridge and resonant circuit. The capacitors are important as they determine how the voltage across the arms during switching is shared by the devices. The capacitors, in combination with the resonant circuit that allows switching at zero crossings enables the use of multiple switching devices to be used without having to worry about getting the switching of the devices perfectly synchronised.

Figure 2:
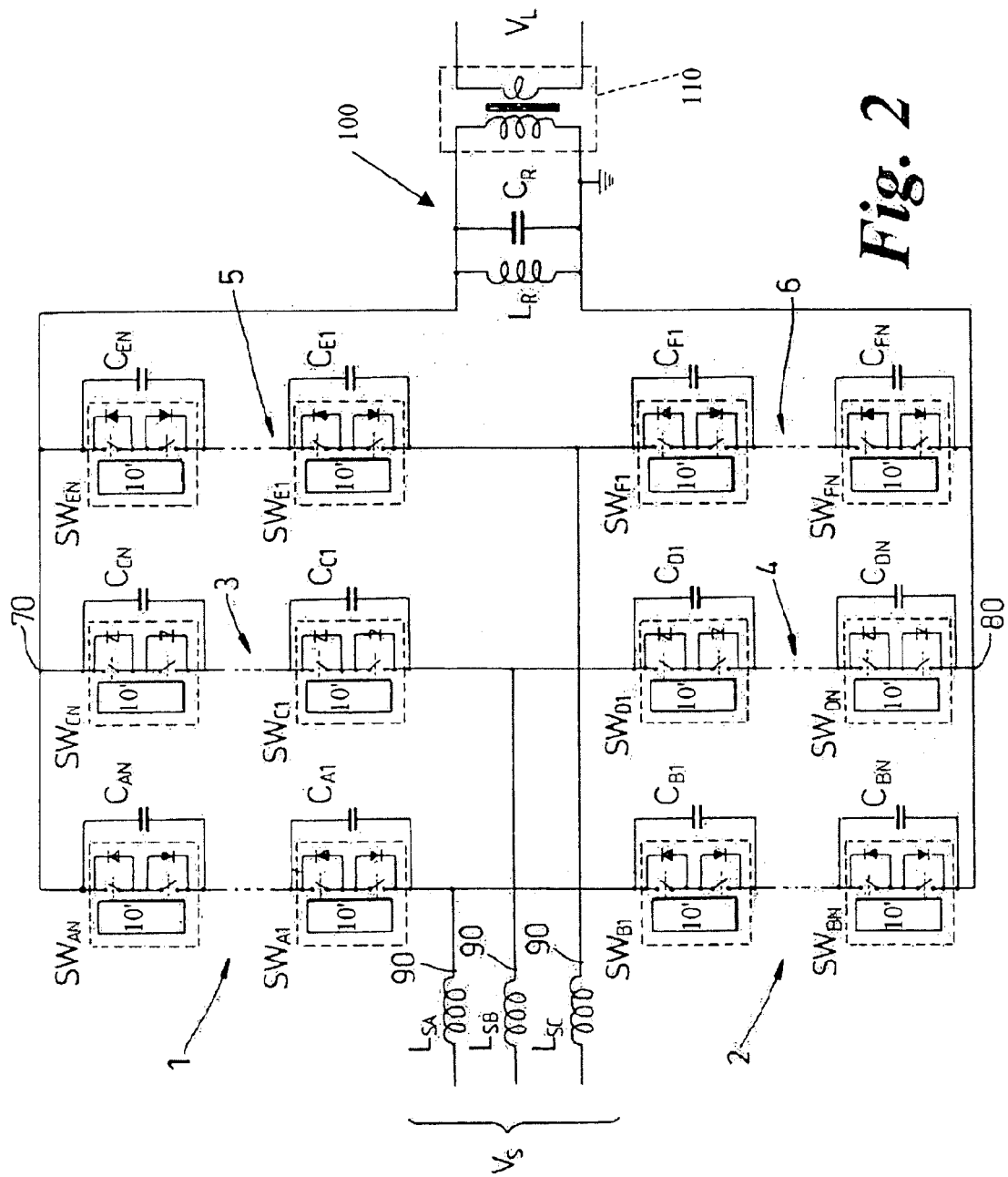
FIG. 2 illustrates an alternative circuit which is adapted to convert a three phase a.c. input voltage into a single phase a.c. output voltage in accordance with the present invention.

A second example is illustrated in FIG. 2 of the accompanying drawings. In this example, the invention provides a converter for converting a three phase a.c. supply voltage to a single phase a.c. output voltage for supply to an a.c. load, such as a motor.

As for the circuit of FIG. 1, the circuit comprises a bridge although as a three phase input is to be converted the bridge has three pairs of serially connected arms 1,2,3,4,5,6 instead of two pairs of arms. The three pairs of arms are connected in parallel to define two output nodes 70,80. Three input nodes 90 are defined (one at the centre of each pair of arms), and two output nodes are defined by the points at which the ends of the three pairs are connected.

Again, a large number of switching devices ($SW_{A(1\ to\ N)}$, $SW_{B(1\ to\ N)}$, etc., are connected in series in each switching assembly, although only two are shown. However, in this example each switching device comprises a pair of switching devices connected back to back rather than n single switching devices. A respective parallel diode is associated with each device, and a single parallel connected capacitor extends across the two back to back devices.

Each pair of back-to-back connected devices defines a bi-directional switch which is required as the input waveform is now a.c. rather than d.c. as for the first example. The skilled man will, of course, appreciate that with the application of suitable control signals this configuration allows the switching of current flow in two directions rather than simply switching current flow on or off.

Again, the single capacitor across each pair of devices controls the rate of change of voltage across the devices and hence regulates voltage sharing in the arms. At high input voltages this is essential to prevent damage to the devices.

Also in common with FIG. 1, an input inductor LSA, LSB,LSC,LSD is provided to ensure a substantially constant feed of current to the circuit from the supply, although in this case three such inductors are needed, one per input node.

A resonant circuit 100 arranged across the output nodes 70,80 is connected in the same way as the first example, and an isolating transformer 110 is connected across the output nodes for supply of an a.c. voltage from the transformer secondary to a load.

A control circuit (not shown in FIG. 2, but similar to that shown in FIG. 1) is provided which transmits the control signals to the isolating control 10' of each pair of switching devices. As for the first example, switching of the devices is effected as the voltage across the resonant circuit crosses zero. However, the switching pattern is more complex as it is necessary to maintain correct control of the current within the input inductor for each phase. This is achieved by switching the inductor across each side of the resonant circuit in such a manner that the average voltage over several half cycles of the resonant circuit will cause the current to rise and fall to the value considered appropriate for the supply voltage on that phase at any moment. As the resonant frequency of the circuit far exceeds that of the input frequency such control can be readily achieved.

It will of course be understood that the two examples are not intended to be limiting, and that many variations are possible. The presence of the resonant circuit enables several switching assemblies of say 50, 60 or more series connected devices to be provided in each arm whilst overcoming problems of synchronisation present in the prior art. This allows a converter to function with input voltages up to 400 kVolts or more to be produced which has not previously been easy to achieve using semiconductor switches.

I claim:

1. A converter for producing an alternating voltage output waveform from a high input voltage, the apparatus comprising:
   a) a bridge circuit having switching assemblies so connected as to define at least two input nodes and two output nodes, the input nodes being operative for receiving the high input voltage across the input nodes, the output nodes being operative for providing a take-off point for the output waveform, each switching assembly comprising at least two high power semiconductor switching devices connected in series between a respective input node and a respective output node to define a respective arm of the bridge circuit, and a capacitor connected in parallel with each of the switching devices in each arm of the bridge circuit;
   b) a resonant circuit having a resonant frequency and connected across the output nodes; and
   c) a control circuit for supplying a control waveform to each switching device in the bridge circuit, the control circuit being operative for generating control signals to switch the switching devices of the switching assemblies in each arm between on and off states in a pattern having a period substantially equal to the resonant frequency of the resonant circuit to provide the output waveform across the output nodes with a frequency which is substantially at the resonant frequency, the control circuit being operative for switching each device in the respective arm of the bridge circuit from the on state to the off state for one half cycle of a current in the resonant circuit, and from the off state to the on state for a remaining one half cycle, the switching being performed substantially at the resonant frequency of the resonant circuit.

2. The converter according to claim 1, in which at least ten semiconductor switching devices are connected in series in each arm of the bridge circuit.

3. The converter according to claim 1, in which each capacitor has a capacitance value selected to determine a rate of change of voltage across a respective switching device when switching from the on state to the off state and vice versa.

4. The converter according to claim 3, in which all the capacitors across the switching devices in a respective arm of the bridge circuit have substantially the same capacitance value.

5. The converter according to claim 3, in which the control circuit is operative for controlling all of the switching devices in the bridge circuit so that all of the switching devices are held in the on state substantially as the voltage across the output nodes crosses zero so as to discharge the capacitors connected across the switching devices, before at least one of the switching devices is switched to the off state.

6. The converter according to claim 5, in which the control circuit is operative for controlling the switching devices so that all of the switching devices are switched to the on state for a predetermined period of time whenever the voltage across the resonant circuit crosses zero.

7. The converter according to claim 1, in which the control circuit comprises a central processing unit that generates a single command signal and modifies it to produce the control signals which respectively determine the on and off states of every switching device in a respective arm of the bridge circuit.

8. The converter according to claim 1, in which the resonant circuit comprises an inductive element which is connected in parallel with a capacitive element between the output nodes.

9. The converter according to claim 1, in which the control circuit is operative for controlling the switching devices so that each of the switching devices of the switching assemblies switches from the on state to the off state, and vice versa, substantially as a voltage across the resonant circuit, and hence the output nodes, crosses zero.

10. The converter according to claim 1, in which an inductor is connected in series between at least one of the input nodes and the switching devices that are connected to said at least one input node.

11. The converter according to claim 1, and further including an isolating transformer having a primary winding and at least one secondary winding, the primary winding being connected across the output nodes, and the secondary winding providing an output from which the output waveform is taken.

12. A converter for converting a steady state high dc input voltage into an alternating voltage output waveform, the converter comprising:

a) a bridge circuit having switching assemblies so connected as to define at least two input nodes and two output nodes, the input nodes being operative for receiving the high input voltage across the input nodes, the output nodes being operative for providing a take-off point for the output waveform, each switching assembly comprising at least two high power semiconductor switching devices connected in series between a respective input node and a respective output node to define a respective arm of the bridge circuit, and a capacitor connected in parallel with at least one of the switching devices in each arm of the bridge circuit, there being at least two pairs of arms connected together to define the two input nodes;

b) a resonant circuit having a resonant frequency and connected across the output nodes; and c) a control circuit for supplying a control waveform to each switching device in the bridge circuit, the control circuit being operative for generating control signals to switch the switching devices of the switching assemblies in each arm between on and off states in a pattern having a period substantially equal to the resonant frequency of the resonant circuit to provide the output waveform across the output nodes with a frequency which is substantially at the resonant frequency, the control circuit being operative for switching each device in the respective arm of the bridge circuit from the on state to the off state for one half cycle of a current in the resonant circuit, and from the off state to the on state for a remaining one half cycle, the switching being performed substantially at the resonant frequency of the resonant circuit.

13. A converter for converting a multiple phase alternating input voltage waveform having a frequency into a single phase alternating voltage output waveform, the converter comprising:

a) a bridge circuit having switching assemblies so connected as to define at least two pairs of input nodes and two output nodes, each of the two pairs of input nodes being operative for receiving the input voltage waveform from one phase of a supply across the input nodes, and the output nodes being operative for providing a take-off point for the single phase alternating voltage output waveform, each switching assembly comprising at least two high power semiconductor switching devices connected in series between a respective input node and a respective output node to define a respective arm of the bridge circuit;

b) a resonant circuit having a resonant frequency and connected across the output nodes; and c) a control circuit for supplying a control waveform to each switching device in the bridge circuit, the control circuit being operative for generating control signals which switch the switching devices of the switching assemblies in each arm between on and off states in a pattern having a period substantially equal to the resonant frequency of the resonant circuit to provide the output waveform across the output nodes at a frequency which is substantially at the resonant frequency, and the resonant frequency being greater than the frequency of the input waveform, the control circuit being operative for switching each device in the respective arm of the bridge circuit from the on state to the off state for one half cycle of a current in the resonant circuit, and from the off state to the on state for a remaining one half cycle, the switching being performed substantially at the resonant frequency of the resonant circuit.

14. An apparatus for producing an alternating voltage output waveform from an input voltage, the apparatus comprising:

a) a bridge circuit having switching assemblies so connected as to define at least two input nodes and two output nodes, the input nodes being operative for receiving the input voltage across the input nodes, the output nodes being operative for providing a take-off point for the output waveform, each switching assembly comprising at least two semiconductor switching devices connected in series between a respective input node and a respective output node to define a respective arm of the bridge circuit, and a capacitor connected in parallel with at least one of the switching devices in each arm of the bridge circuit;

b) a resonant circuit having a resonant frequency and connected across the output nodes; and c) a control circuit for supplying a control waveform to each switching assembly in the bridge circuit, the control circuit being operative for generating control signals to switch the switching devices of the switching assemblies in each arm between on and off states in a pattern having a period substantially equal to the resonant frequency of the resonant circuit to provide the output waveform across the output nodes with a frequency which is substantially at the resonant frequency, the control circuit being operative for switching each device in the respective arm of the bridge circuit from the on state to the off state for one half cycle of a current in the resonant circuit, and from the off state to the on state for a remaining one half cycle, the switching being performed substantially at the resonant frequency of the resonant circuit.

* * * * *